(12) United States Patent
Damlo et al.

(10) Patent No.: US 9,162,087 B2
(45) Date of Patent: Oct. 20, 2015

(54) DOUBLE TEAR BAG FOR EMERGENCY OXYGEN SYSTEM

(71) Applicant: INTERTECHNIQUE, Plaisir (FR)

(72) Inventors: Craig Damlo, Stockelsdorf (DE); Wolfgang Rittner, Ahrensbok (DE)

(73) Assignee: Zodiac Aerotechnics, Plaisir (FR)

( * ) Notice: Subject to any disclaimer, the term of this patent is extended or adjusted under 35 U.S.C. 154(b) by 180 days.

(21) Appl. No.: 13/888,398

(22) Filed: May 7, 2013

(65) Prior Publication Data

US 2014/0001068 A1   Jan. 2, 2014

Related U.S. Application Data

(60) Provisional application No. 61/665,496, filed on Jun. 28, 2012.

(51) Int. Cl.
| | |
|---|---|
| *B65D 65/00* | (2006.01) |
| *B65D 75/00* | (2006.01) |
| *A62B 18/02* | (2006.01) |
| *A62B 7/02* | (2006.01) |
| *A62B 9/04* | (2006.01) |
| *A62B 7/14* | (2006.01) |
| *A62B 25/00* | (2006.01) |

(52) U.S. Cl.
CPC . *A62B 18/02* (2013.01); *A62B 7/02* (2013.01); *A62B 7/14* (2013.01); *A62B 9/04* (2013.01); *A62B 25/005* (2013.01); *B64D 2231/025* (2013.01)

(58) Field of Classification Search
CPC ............ A62B 18/02; A62B 9/04; A62B 7/02; A62M 11/00; A61B 5/08
USPC .......... 206/570–571, 364, 428; 383/200, 207, 383/209; 128/205.25
See application file for complete search history.

(56) References Cited

U.S. PATENT DOCUMENTS

| | | | | |
|---|---|---|---|---|
| 2,838,085 | A * | 6/1958 | Beeler ........................... | 190/115 |
| 4,850,954 | A * | 7/1989 | Charvin ........................ | 604/6.14 |
| 4,925,448 | A * | 5/1990 | Bazaral ......................... | 604/171 |
| 5,163,554 | A * | 11/1992 | Lampropoulos et al. ..... | 206/363 |
| 5,226,530 | A * | 7/1993 | Golden .......................... | 206/210 |
| 2013/0060159 | A1 * | 3/2013 | Bromwich et al. ........... | 600/559 |

* cited by examiner

*Primary Examiner* — Mickey Yu
*Assistant Examiner* — Chun Cheung
(74) *Attorney, Agent, or Firm* — Kilpatrick Townsend & Stockton LLP; Dean W. Russell, Esq.

(57) ABSTRACT

The invention relates to an emergency tubing set, including an oxygen mask adapted to cover a users mouth and nose, a tubing connected at a first end to said tubing set to provide oxygen to said oxygen mask, and a connect or connected to said tubing at a second end opposed to said first end, the connector being adapted to be connected to an oxygen source for supplying oxygen to said tubing. According to the invention the tubing includes an excess tubing section and a connecting tubing section wherein the excess tubing section is stored in a bottom pouch and a first part of an intermediate tubing section is arranged inside the bottom pouch and a second part of said intermediate tubing section is arranged outside said bottom pouch, wherein the intermediate tubing interconnects the excess tubing section and the connecting tubing section.

11 Claims, 1 Drawing Sheet

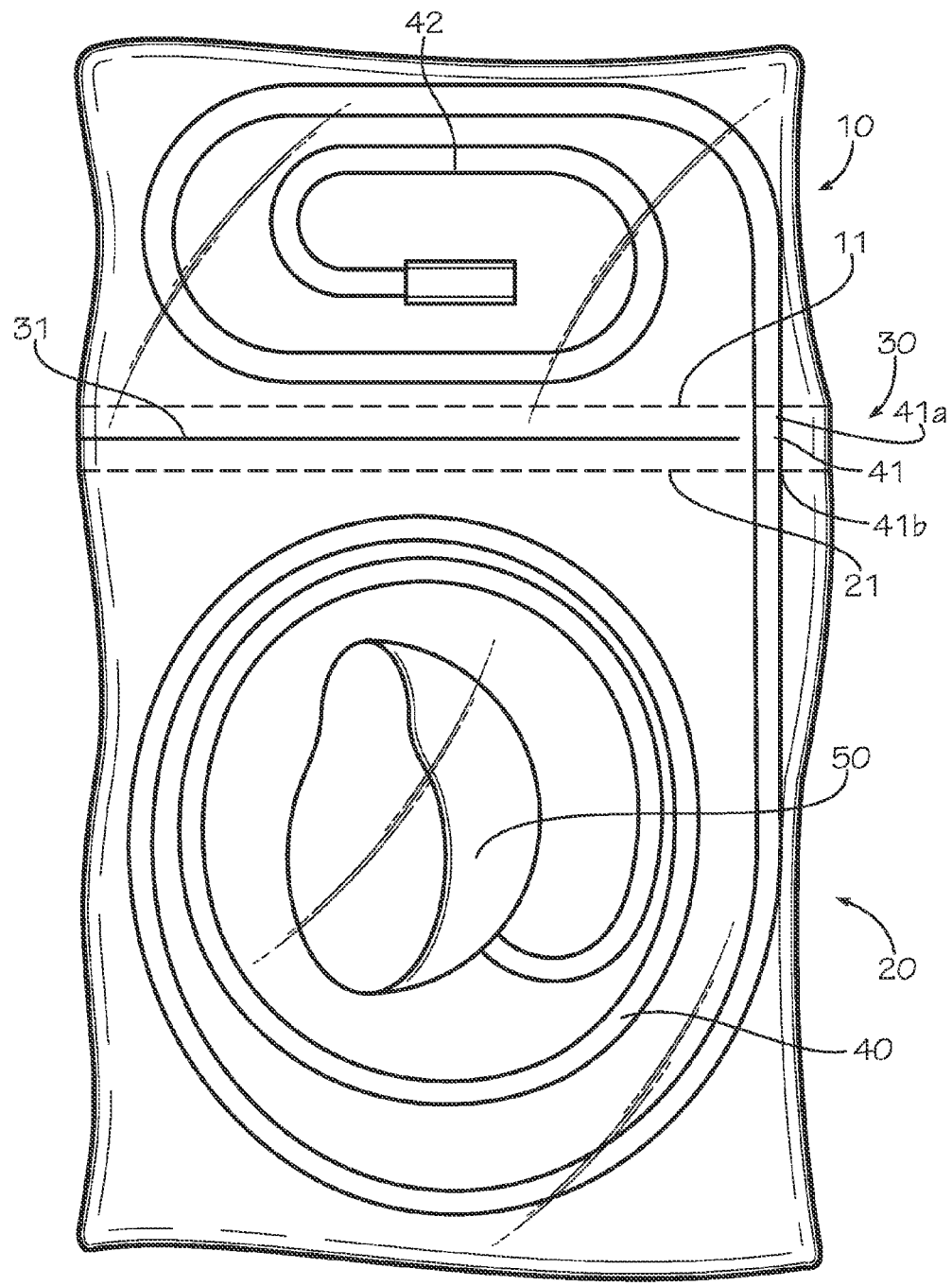

DOUBLE TEAR BAG FOR EMERGENCY OXYGEN SYSTEM

CROSS-REFERENCE TO RELATED APPLICATIONS

This application claims priority to and the benefit of U.S. Provisional Patent Application Ser. No. 61/665,496 filed Jun. 28, 2012, the contents of which are incorporated herein by this reference.

FIELD OF THE INVENTION

The invention relates to an emergency tubing set, comprising an oxygen mask adapted to cover a users mouth and nose, a tubing connected at a first end to said tubing set to provide oxygen to said oxygen mask, and a connector connected to said tubing at a second end opposed to said first end, the connector being adapted to be connected to an oxygen source for supplying oxygen to said tubing.

BACKGROUND

Such emergency tubing sets are used to supply oxygen to passenger or crew member of an aircraft in case of an emergency situation like a decompression situation or smoke or fire onboard of an aircraft.

Usually, an emergency oxygen system comprises an oxygen source like a chemical oxygen generator or a pressure tank comprising pressurized oxygen, a control unit for controlling the pressure of the oxygen supplied to a person using the system and a supply line directing the oxygen from the oxygen source to an oxygen mask. The oxygen mask is adapted to cover both mouth and nose of the person using the system.

Such oxygen systems must be examined in certain maintenance intervals for proper function. In the course of such maintenance, certain replacement parts having limited storage intervals must be replaced. Further, such emergency oxygen systems comprise elements which are sensitive to hygienic requirements like the oxygen mask and the tubing, and others, which are not sensitive to hygienic requirements.

A problem associated with the tubing and the oxygen mask, generally addressed as emergency tubing set in the description and the claims, is related to the need to manually connect such tubing set to an oxygen source on the one hand and hygienic requirements for protecting such tubing set against contamination with dust, bacteria or other sources which may adversely affect the hygienic requirements on the other hand.

SUMMARY OF THE INVENTION

It is an object of the invention to improve the handling and the maintenance intervals of such emergency oxygen system, and to facilitate the handling and the maintenance and mounting of such systems.

This object is achieved with an emergency tubing set as described in the introductory portion wherein the tubing comprises an excess tubing section and a connecting tubing section wherein the excess tubing section is stored in a bottom pouch and a first part of an intermediate tubing section is arranged in side the bottom pouch and a second part of said intermediate tubing section is arranged outside said bottom pouch, wherein the intermediate tubing interconnects the excess tubing section and the connecting tubing section.

According to the invention, the tubing comprises three sections, namely the excess tubing section the intermediate tubing section and the connecting tubing section and allows the excess tubing section to be stored in a bottom pouch. By this, the excess tubing section can be sealed against adverse influence like dirt, dust or other sources of bacteria. The connecting tubing section, which needs to be connected to an oxygen source, is not arranged in said bottom pouch and thus can be easily connected to an oxygen source. However, the connecting tubing section is permanently connected to the excess tubing section via the intermediate tubing section. This allows to store the tubing set in a connected state to allow quick supply of oxygen in case of an emergency. The intermediate tubing section is partially arranged inside the bottom pouch and partially arranged outside the bottom pouch. By this, a sealing of the bottom pouch in a sealing region around the intermediate tubing section is made possible and thus the inside of the bottom pouch can be maintained as a sealed space against ambient influence. Thus, the excess tubing section which is in close relationship to mouth and nose of a person using the emergency tubing set, can be sealed against contamination but at the same time hold in permanent connection to an oxygen source.

The particular setup of the emergency tubing set according to the invention thus allows to reach two contrary requirements at the same time, namely to safely seal the part of the tubing set which is critical for hygienic reason, namely the part being close to mouth and nose of the person using the device but at the same time to allow easy mounting and connecting the tubing set to an oxygen source.

According to a first preferred embodiment the bottom pouch comprises a sealing enclosing an interior space of said pouch comprising the excess tubing section and the oxygen mask, wherein further the first part of said intermediate tubing section is arranged in a sealing region of said sealing. By this embodiment, the oxygen mask is comprised in the bottom pouch, too, and thus can be sealed against contamination in a safe manner. Further, the sealing of the bottom pouch seals the interior space comprising the excess tubing section and the oxygen mask versus the environment. The intermediate tubing section is arranged in the sealing region and may be fixed within said sealing region in a sealed condition to prevent contaminants from entering the interior space of the bottom pouch.

According to a further preferred embodiment, the connecting tubing section is stored in a top pouch. With this improved embodiment, it is possible to deliver the whole emergency tubing set in a condition sealed against contamination. The tubing set can be used as first original equipment or as a replacement part. By storing the excess tubing section in a bottom pouch and the connecting tubing section in a top pouch it is possible to separately open either the top pouch or the bottom pouch independently from each other. By this, the tubing set may be connected to an oxygen source by opening the top pouch without the need to open the bottom pouch and thus the excess tubing set and the oxygen masks are stored in a sealing state within the bottom pouch and only that part of the tubing set which is stored in the top pouch can be released and taken out of the top pouch to connect the tubing set to an oxygen source.

According to a further preferred embodiment, the second part of said intermediate tubing section is arranged inside the top pouch and the first part of said intermediate tubing section is arranged outside said top pouch.

According to this preferred embodiment the intermediate tubing section bridges a distance between the top pouch and the bottom pouch and is both arranged inside the top pouch and the bottom pouch. By this, it is possible to sealingly fix the intermediate tubing section in both the top pouch and the bottom pouch and to thus allow a safe sealing of the whole tubing set against contamination during storage and transport. Only when being used and connected to an oxygen source, the top pouch needs to be opened but in this case the access tubing section and the oxygen mask can be preserved in a sealed state within the bottom pouch.

It is further preferred that the bottom pouch is connected to the top pouch. By this preferred embodiment, any forces acting onto the excess tubing section only or the connecting tubing section only will not impart a force or tension on the intermediate tubing section inducing the risk of damage to this intermediate tubing section but will be transferred from the top pouch to the bottom pouch via the connection of said two pouches. The connection of the two pouches may be provided as a parallel connection of these pouches to the intermediate tubing section being arranged and preferably sealingly fixed to the top pouch and the bottom pouch.

In particular, it is preferred that the bottom pouch is a lower section of a bag and the top pouch is an upper section of said bag, the lower and the upper section being separated by a sealing region.

According to this embodiment, the bottom pouch and the top pouch can be manufactured from one single bag or tube material being divided into a top pouch and a bottom pouch in the manufacturing process. Thus, it is possible to first store the excess tubing set, the connecting tubing set and the intermediate tubing set within one bag and to thereafter divide said one bag into two pouches by a sealing action along a sealing and connecting line of the two pouches. This connecting line is included in the sealing region separating the interior space of the top pouch from the interior space of the bottom pouch and allowing an individual opening of either the top pouch or the bottom pouch without contamination to the other pouch, respectively.

Further, it is preferred that the sealing region comprises a permanent sealing line and at least one snap sealing line. By providing such a sealing region having a permanent sealing line and at least one snap sealing line it is possible to open the top or the bottom pouch once only and keep the bottom pouch or the top pouch, respectively, sealed. A permanent sealing region shall be understood as a sealing region which is provided during the manufacturing process and may be opened by cutting or tearing action or the like once but cannot be closed again thereafter. A snap sealing line shall be understood as a sealing line which is provided during the manufacturing process of the pouch in such a way that it can be early opened by a fearing action or the like. The snap sealing line may be configured such that it is closed by an adhesive function or a form locking action or a combination of both.

Still further, it is preferred that wherein the sealing region comprises a first snap sealing line sealing the top pouch and a second snap sealing line sealing the bottom pouch. This specific configuration allows the top pouch and the bottom pouch to be opened independently from each other by providing snap sealing lines in a distance and preferably parallel to each other for an easy opening of the top pouch on the one side and the bottom pouch on the other side.

Further, it is preferred that a permanent sealing line is arranged between said first and second snap sealing line. With this embodiment a compact and integrated design of both the top pouch and the bottom pouch is provided and connected in such a way to withstand mechanical forces acting onto either the top pouch or the bottom pouch. At the same time, the top pouch and the bottom pouch can be separated from each other by opening either the top or the bottom snap sealing line but by this course of action neither the corresponding either pouch is directly opened against ambient pressure and exposed to contamination due to the permanent sealing line. To this regard, it is possible to open first or the second snap sealing line to provide access to the interior of the top pouch or the bottom pouch, respectively.

According to a further preferred embodiment a permanent sealing line starts at one edge of said bag and extends to an opposed edge of said bag to divide said bag into an upper part defining the top pouch and a lower part defining the bottom pouch. By this embodiment, the permanent sealing lines divides the bag into the upper part and the lower part defining the top pouch and the bottom pouch, respectively and allows to separate said two pouches from each other but maintains a strong mechanical connection between the two pouches for storage and transport purposes.

It is further preferred in this embodiment that the permanent sealing line ends at a distance of said opposed edge of said bag and the intermediate tubing section is arranged between said opposed edge and said end of said sealing line. With this embodiment it is provided a safe mechanical connection and sealing of the two pouches versus the environment and versus each other but at the same time an easy manufacturing of the tubing set with a safe sealing of the intermediate tubing section in an end region of said sealing line is made possible. In this embodiment, the sealing line leaves a short distance between the opposed edge and the end of the sealing line itself to allow positioning of the intermediate tubing section in this short distance which is not sealed by the sealing line. It is to be understood that the short section, wherein the sealing line is not present, may be, however, sealed against the intermediate tubing section in any way to separate the interior space of the top pouch from the interior space of the bottom pouch in a safe manner.

It is further preferred that the intermediate tubing section is sealing fixed to the bag between said opposed edge and said end of said sealing line to shut off the interior space of the bottom pouch from the interior space of said top pouch.

According to this embodiment, the intermediate tubing section is fixed and sealed versus the bag in the interconnecting region between the top and the bottom bag and thus any contamination of one of the pouches is safely prevented if the other of the two pouches is opened. The sealing of the intermediate tubing section against the bag may be provided by an adhesive or a heat sealing action safely connecting the bag and the intermediate tubing section.

According to a further aspect of the invention a portable emergency oxygen breathing apparatus is provided, comprising an oxygen source, a control unit for controlling the flow of oxygen out of said oxygen source and a tubing set as described beforehand. Such portable emergency oxygen breathing apparatus is used on board of an aircraft to supply oxygen to a crew member in an emergency situation and needs maintenance in regular time intervals. Thus, the tubing set according to the invention is specifically well-adapted and suited for use in connection with such a portable emergency oxygen supply apparatus as it allows permanent storage of the apparatus in a safely sealed condition and easy replacement of the tubing set which is sensitive to hygienic requirements in the course of maintenance of such portable emergency oxygen supply device.

BRIEF DESCRIPTION OF THE DRAWING

A preferred embodiment of the invention is described referring to the FIGURE. The FIGURE shows a schematic view of a tubing set stored within a bag according to the invention.

DETAILED DESCRIPTION

As can be seen, the bag is divided into a top pouch 10 and a bottom pouch 20 by a sealing region 30. The sealing region 30 comprises an upper (or first) snap sealing line 11 and a bottom (or second) sealing line 21. The upper sealing line 11 is arranged to allow opening of the top pouch and the bottom sealing line 21 is arranged to allow opening of the bottom pouch 20.

A permanent sealing line 31 is arranged between the upper and the bottom snap sealing line 11, 21. The permanent sealing line 31 is manufactured by a heat sealing action. The upper and bottom snap sealing line are configured as snap sealing lines for opening the top or bottom pouch respectively, by a tearing action along said lines.

The bottom pouch 20 forms an interior space wherein an excess tubing section 40 is stored in permanent connection to an oxygen mask 50 which is stored inside said bottom pouch, too. The excess tubing section serves to bridge the main part of distance between an oxygen source and the mouth and nose of a user using said oxygen source for supply of oxygen. The bottom pouch thus needs to be opened in an emergency situation only.

In the top pouch 20 a connecting tubing section 42 is arranged. Said connecting tubing section serves to connect the tubing set to an oxygen source and thus the top pouch usually needs to be opened in the course of mounting or refitting the whole emergency system with the tubing set. The top pouch, however, can be opened without requiring the bottom pouch to be opened and thus the tubing set can be connected to an oxygen source in such a way that the whole excess tubing section and the oxygen mask is preserved in a sealed space and thus sealed against contamination. The excess tubing section stored in the bottom pouch and the connecting tubing section stored in the top pouch are connected with each other via an intermediate tubing section 41. Said intermediate tubing section bridges the sealing region 30 close to one edge of the bag and is arranged in the bag itself completely. A first part 41a of said intermediate tubing section is arranged inside the top pouch 10 and a second part 41b of said intermediate tubing section is arranged in the bottom pouch 20.

The intermediate tubing section is sealed by a heat sealing action along the permanent sealing line 31. Alternatively, the intermediate tubing section may not be fixed to the bag and thus may be moved into the top or bottom pouch to allow a balance of length of the connecting tubing section and the excess tubing section. Thus, the connecting tubing section and the excess tubing section are connected with each other for a flow of oxygen from the connecting tubing section to the excess tubing section and the oxygen mask via the intermediate tubing section permanently. This flow connection is not disrupted in case of opening of any of the permanent sealing line 31, (first) snap sealing line 11, or (second) snap sealing line 21.

The invention claimed is:

1. An emergency tubing set, comprising:
   an oxygen mask adapted to cover a user's mouth and nose,
   a tubing connected at a first end so as to provide oxygen to said oxygen mask, and
   a connector connected to said tubing at a second end opposed to said first end, the connector being adapted to be connected to an oxygen source for supplying oxygen to said tubing,
   wherein the tubing comprises an excess tubing section and a connecting tubing section, wherein the excess tubing section is stored in a bottom pouch and a first part of an intermediate tubing section is arranged inside the bottom pouch and a second part of said intermediate tubing section is arranged outside said bottom pouch, wherein the intermediate tubing interconnects the excess tubing section and the connecting tubing section,
   wherein the connecting tubing section is stored in a top pouch,
   wherein the bottom pouch is connected to the top pouch,
   wherein the bottom pouch is a lower section of a bag and the top pouch is an upper section of said bag, the lower and the upper sections being separated by a sealing region, and
   wherein the sealing region comprises a permanent sealing line and at least one snap sealing line.

2. An emergency tubing set, comprising:
   an oxygen mask adapted to cover a user's mouth and nose,
   a tubing connected at a first end so as to provide oxygen to said oxygen mask, and
   a connector connected to said tubing at a second end opposed to said first end, the connector being adapted to be connected to an oxygen source for supplying oxygen to said tubing,
   wherein the tubing comprises an excess tubing section and a connecting tubing section, wherein the excess tubing section is stored in a bottom pouch and a first part of an intermediate tubing section is arranged inside the bottom pouch and a second part of said intermediate tubing section is arranged outside said bottom pouch, wherein the intermediate tubing interconnects the excess tubing section and the connecting tubing section,
   wherein the connecting tubing section is stored in a top pouch,
   wherein the bottom pouch is connected to the top pouch,
   wherein a sealing region separates the top pouch and the bottom pouch, and
   wherein the sealing region comprises a first snap sealing line sealing the top pouch and a second snap sealing line sealing the bottom pouch.

3. The tubing set according to claim 2,
   further comprising a permanent sealing line arranged between the first and the second snap sealing lines.

4. The tubing set according to claim 1,
   wherein the permanent sealing line starts at one edge of said bag and extends toward an opposed edge of said bag to divide said bag into the upper section and the lower section.

5. The tubing set according to claim 4,
   wherein the permanent sealing line ends at a distance of said opposed edge of said bag and the intermediate tubing section is arranged between said opposed edge and said end of said permanent sealing line.

6. The tubing set according to claim 5,
   wherein the intermediate tubing section is sealingly fixed to the bag between said opposed edge and said end of said sealing line to shut off the interior space of the bottom pouch from the interior space of said top pouch.

7. A portable emergency oxygen supply apparatus, comprising an oxygen source, a control unit for controlling the flow of oxygen out of said oxygen source and a tubing set according to claim 1 connected to said control unit.

8. The tubing set according to claim 1,
wherein the second part of said intermediate tubing section is arranged inside the top pouch and the first part of said intermediate tubing section is arranged outside said top pouch.

9. The tubing set according to claim 2,
wherein the second part of said intermediate tubing section is arranged inside the top pouch and the first part of said intermediate tubing section is arranged outside said top pouch.

10. The tubing set according to claim 2,
wherein the bottom pouch is a lower section of a bag and the top pouch is an upper section of said bag, the lower and the upper sections being separated by the sealing region.

11. A portable emergency oxygen supply apparatus,
comprising an oxygen source, a control unit for controlling the flow of oxygen out of said oxygen source and a tubing set according to claim 2 connected to said control unit.

* * * * *